United States Patent
Enis et al.

(10) Patent No.: US 9,903,272 B2
(45) Date of Patent: Feb. 27, 2018

(54) METHOD AND APPARATUS FOR INTEGRATING ON-SHORE GREEN AND OTHER ON-SHORE POWER SOURCES WITH A COMPRESSED AIR ENERGY STORAGE SYSTEM ON A FLOATING POWER PLANT

(71) Applicants: Ben Enis, Henderson, NV (US); Paul Lieberman, Torrance, CA (US)

(72) Inventors: Ben Enis, Henderson, NV (US); Paul Lieberman, Torrance, CA (US)

(*) Notice: Subject to any disclaimer, the term of this patent is extended or adjusted under 35 U.S.C. 154(b) by 637 days.

(21) Appl. No.: 13/888,576

(22) Filed: May 7, 2013

(65) Prior Publication Data
US 2014/0333069 A1    Nov. 13, 2014

(51) Int. Cl.
*H02K 7/18*    (2006.01)
*F02C 6/16*    (2006.01)
*H02S 10/20*   (2014.01)
*H02S 10/12*   (2014.01)
*H02J 3/38*    (2006.01)
(Continued)

(52) U.S. Cl.
CPC ............. *F02C 6/16* (2013.01); *H02J 3/381* (2013.01); *H02J 15/00* (2013.01); *H02S 10/12* (2014.12); *H02S 10/20* (2014.12); *B63B 2035/4433* (2013.01); *F03D 9/17* (2016.05); *H02J 3/382* (2013.01); *H02J 3/383* (2013.01); *H02J 3/386* (2013.01); *Y02E 10/563* (2013.01); *Y02E 10/725* (2013.01); *Y02E 10/763* (2013.01); *Y02E 20/14* (2013.01); *Y02E 60/15* (2013.01); *Y02E 70/30* (2013.01)

(58) Field of Classification Search
CPC ... B21J 7/24; B25D 9/08; B25D 11/06; B60S 1/10; F01B 17/02; F01B 17/022; F01K 25/06; F01K 25/10; F01K 27/00; F03D 9/001; F03D 9/028; H02J 15/006; Y02E 10/72; Y02E 60/15
USPC ................. 60/370, 407, 408, 415, 417, 682; 290/1 R
See application file for complete search history.

(56) References Cited

U.S. PATENT DOCUMENTS 6,927,503 B2    8/2005    Enis
6,963,802 B2    11/2005    Enis
(Continued)

OTHER PUBLICATIONS

U.S. Appl. No. 13/610,044, filed Sep. 11, 2012, Ben M. Enis.
(Continued)

*Primary Examiner* — Mark Laurenzi
*Assistant Examiner* — Mickey France
(74) *Attorney, Agent, or Firm* — MU P.C.

(57) ABSTRACT

An offshore compressed air energy storage system has a barge comprising with a deck, and at least one pressure vessel configured to store compressed air. A power source powers at least one air compressor configured to pressurize the pressure vessel. A compander set has at least one turboexpander having an input, an output, and a shaft, as well as at least one heat exchanger and at least one turbocompressor. A mass air control valve is configured to control the compressed air flow from the pressure vessel to the turboexpander. A generator is in communication with the shaft of the turboexpander, and a control system. The at least one pressure vessel is buoyant, and wherein the at least one air compressor, the turboexpander, the mass air control valve, and the generator are attached to the barge.

14 Claims, 13 Drawing Sheets

(51) Int. Cl.
*H02J 15/00* (2006.01)
*B63B 35/44* (2006.01)
*F03D 9/17* (2016.01)

(56) References Cited

U.S. PATENT DOCUMENTS

| | | |
|---|---|---|
| 7,067,937 B2 | 6/2006 | Enis |
| 7,155,912 B2 | 1/2007 | Enis |
| 7,250,691 B2 | 7/2007 | Enis |
| 7,308,361 B2 | 12/2007 | Enis |
| 7,504,739 B2 | 3/2009 | Enis |
| 2007/0295673 A1* | 12/2007 | Enis .................. C02F 1/10 210/766 |
| 2010/0326075 A1* | 12/2010 | Fong .................. F01K 25/06 60/650 |

OTHER PUBLICATIONS

U.S. Appl. No. 11/700,503, filed Aug. 9, 2007, Ben M. Enis.
U.S. Appl. No. 61/062,149, filed Jan. 24, 2008, Ben M. Enis.
U.S. Appl. No. 61/068,170, filed Mar. 5, 2008, Ben M. Enis.
U.S. Appl. No. 61/195,418, filed Oct. 7, 2008, Ben M. Enis.
U.S. Appl. No. 12/321,689, filed Jan. 26, 2009, Ben M. Enis.
U.S. Appl. No. 61/195,418, Ben M. Enis.

* cited by examiner

FIG. 3

| SYSTEMS FOR PRE-COOLING COMBUSTION TURBINES | TEMPERATURE DROP |
|---|---|
| Evaporative Cooling, Fog Systems, High Pressure Fog Systems And Wet Compression | 15°F to 25°F |
| Mechanical and Refrigeration Systems | 45°F |
| Enis/Lieberman System using<br>1. Compander, T-CAES, TL-CAES or UW-CAES<br>2. Eductor of Ambient Air or Desalination System<br>3. Centrifuge | 122°F |

FIG. 4

| SOURCE | INPUT CONDITIONS | OUTPUT CONDITIONS | OUTPUT ELECTRIC POWER (kWe) |
|---|---|---|---|
| L.A. Turbine Valencia, CA (One Stage) | 100°F 114.67 psia | -104°F 19.67 psia | 100 kWe to 40 MWe |
| Texas Turbine Azle, Texas (1st Stage) | 77°F 300 psia | -56.5°F 85 psia | |
| Texas Turbine (2nd Stage) | -55°F 80 psia | -181°F 15 psia | |
| ACD Turbines Santa Ana, CA (1st Stage) | 70°F 90 psia | -82.5°F 65 psia | 100 kWe to 40 MWe |
| ACD Turbines (2nd Stage) | -82°F 65 psia | -174.5°F 20 psia | 0 kWe only thermal power output |

METHOD AND APPARATUS FOR INTEGRATING ON-SHORE GREEN AND OTHER ON-SHORE POWER SOURCES WITH A COMPRESSED AIR ENERGY STORAGE SYSTEM ON A FLOATING POWER PLANT

CROSS-REFERENCE TO RELATED APPLICATION(S)

Not Applicable

BACKGROUND OF THE INVENTION

1. Field of Invention

The present invention relates to the field of energy storage systems, more specifically, compressed air energy storage systems.

2. Description of Related Art

In the early 2000s, the capacity of the floating power plant (FPP) was pushed to a much higher level with the design and construction of a 220 MW combined cycle power barge that was installed in India. This barge used aero-derivative gas turbine technology with heat recovery, inlet air chilling and a steam turbine generator producing a highly efficient plant that initially used naphtha as a fuel. Herein, we intend to use the similar type gas turbine generator set but with a much higher intensity of inlet air cooling.

Floating power barge designs are now charting new territory with projects on the boards with capacities up to 550 MW using technologies that include combined cycle with industrial and aero-derivative gas turbines and Integrated Gasification combined cycle (IGCC) schemes. Greater consideration is also being given to emissions and different fuels, particularly as the cost of oil increases to higher levels. LNG, CNG and coal fueled projects are now being considered for installation on FPPs.

The FPP is not designed to sit in waters that are aggravated by waves. The FPP is not made to sail like a vessel at sea but rather it is designed for service in protected inland waters such as rivers, lagoons, or ports.

One of the more significant differences of a floating power plant to a land based plant is its transportability being capable of moving the unit from one location to another. This is achieved with the use of submersible heavy lift ships, designed to move very large structures around the world weighing upwards of 60,000 tons.

A total of about four self-propelled power ships are currently deployed around the world, while there are over 75 power barges worldwide, including over 600 MW of generation capacity in New York City. Power barges can be built very quickly in comparison to a power ship or a land based plant. A 100 MW gas turbine power barge can be built in about 3 months and be ready for deployment.

The following is a list of the special advantages available from the floating power plant (or power barge or power ship):

a. A floating power plant can be moved from one location to another in a matter of weeks, and can connect to the grid to alleviate local shortages,
b. Simple and straight forward location of power station where power is required.
c. Fast supply of electricity to areas with limited infrastructure,
d. Installation is possible in areas with poor logistic infrastructure.
e. Independent from soil quality
f. Provides additional safety in areas prone to earthquakes and flooding.
g. Where land space is limited, a large site area not needed,
h. Mobile asset for the owner, possibility to with an opportunity for trade.
i. Can be constructed in shipyards under controlled conditions.
j. Minimal environmental impact as only a small area of coastal or up-river land is required.
k. Relatively fast construction (dependent upon equipment availability).
l. Short building times: for example, 70 MW power station can be installed in less than 12 months.
m. Can utilize any electrical generating technologies.
n. Transportable power; large capacity can be moved to areas of need quickly.
o. Fuels can be supplied by ocean transport and stored in adjacent barges.
p. Financially viable asset for installation in developing countries.
q. Floating power stations can take advantage of financing incentives from shipbuilding regions.
r. Minimum operator's investment risk due to the mobility, versatility and adaptability of this type of plant.
s. Supports rapid infrastructure development in remote regions.
t. Independence from local infrastructure.
u. Reduced reliance on poor or nonexistent local capabilities.
v. Unaffected by landslides and earthquakes.
w. The floating power station is supplied with surrounding water heat exchange (especially useful for the compressed air energy storage system pressure vessel operation).

The size of each pressure vessel and number of pressure vessels are the key cost drivers of the T-CAES system. Thus, when these vessels comprise the basic physical structure of the barge and barge floatation system, the overall cost of the T-CAES system is the most cost competitive in this scenario compared to battery systems. Battery systems are space consuming and reduce the payload capacity of the barge compared to the T-CAES system.

The technical performance of the T-CAES system is enhanced by having the steel pressure vessels immersed in water. Thus as the compressed air is released from the steel walled pressure vessel, the residual air temperature in the pressure vessel tends lose temperature at a slower rate because of the heat drawn in across the steel/water interface into the residual air in the tank.

Transportable Compressed Air Energy Storage (T-CAES) System

The conventional compressed air energy storage (CAES) systems have used inexpensive night time commercial power, air compressors, and an underground cavern as a pressure vessel for energy storage. During the daytime when the electricity power rates and energy rates are more expensive fuel and the compressed air from the cavern are combined in combustion driven electric generator set that results in a cost savings.

More recent designs have suggested the use of wind turbine farms and/or solar farms to supply the excess (not immediately used by the local grid) electrical power from these green power sources to drive the compressors whenever the excess power is available. In all cases combustion is used to drive the generator set.

The key cost savings feature of the underground cavern pressure vessel storage is the availability of existing deep underground caverns or initial deep underground caverns that can be enlarged by inexpensive mining . . . especially in the case of salt caverns. On the other hand, after locating a site, expending funds, and time, the cavern may reveal itself to be flawed as in the case of the CAES system intended for Iowa. Furthermore, not every naturally occurring cavern is located near a city that requires its use or located near a high wind zone.

Based on the foregoing, there is a need in the art for a highly efficient and effective compressed air energy storage system that will greatly improve the functionality, availability, cost, and ecological impact relative to current systems.

SUMMARY OF THE INVENTION

The authors (Dr. Ben Enis and Dr. Paul Lieberman) have introduced a variation of the CAES system wherein the pressure vessel is a (1) Thick walled steel storage tank, (2) Miles-long thick steel walled pipeline, (3) Underwater reinforced concrete series of storage tanks with metal output pipes or a (4) Thick walled vertical mast of a tall wind turbine. The objective of the CAES system was to not only store the input energy as high pressure air but also for the thick walled steel pressure vessel to release its heat content when the internal air pressure drops when the compressed air is continuously discharged to the turboexpander that powers the electric generator set. No combustion is used to drive the turboexpander/generator set.

The net result is that the green energy sources such as wind and solar photovoltaic energies are used to produce electricity without combustion. There are no greenhouse gases emitted. The lack of combustion also provides a lifetime greater than 50 years, because high temperature and corrosion atmospheres are eliminated in the electricity generating equipment.

Another result is that for every 1 MW of electricity produced there is 1 MW of thermal energy produced. The thermal energy exists in the form of a high mass flow of super-a chilled air ($-170°$ F. to $-180°$ F.) exhausted from the turboexpander expansion impeller.

In June 2004, a 75 kWe version of the Enis/Lieberman Compressed Air Energy Storage System (CAES) was tested at National Technical Systems in Santa Clarita, Calif. The CAES system was comprised of a compressor, piping system, high pressure storage vessels and a turboexpander/generator set (FIG. 1). General Electric supplied the turboexpander/generator set and S2M of St. Marcel, France supplied the special high speed (28,000 RPM) bearing. S2M is the world's biggest producer of magnetic bearings. The control system, sensors, instrumentation and recorders were set to display the generation of 75 kW of electrical power and 75 kW of thermal power. The thermal power was the high mass flow of super-chilled ($-175°$ F.) air. Hot water was collected from the (1) Inter-stage condensation of the air compressor (2) Coolant water of the compressor and (3) Coolant water of the electricity generator.

The California Energy Commission sponsored Dr. Paul Lieberman for a series of heat transfer tests that provided the design data required to specify the pressure vessel diameter and pressure vessel steel wall thickness to assure that the expulsion of the compressed air does not produce an excessive pressure drop in the expanding air being released from the pressure vessel. The heat release from the room temperature walls of the thick walled pressure vessel had to be sufficiently rapid to compete with the temperature drop in the expanding air for a specified expulsion rate of air.

The advantage of the Enis/Lieberman CAES system is that it is not limited by geography or geology in its choice of location as is the case of the underground cavern CAES systems.

As mentioned earlier, the impressive cost savings for the underground cavern version of the CAES system is the availability of the nearly pre-existing pressure vessel . . . the deep underground cavern. This cost savings becomes available to the Enis/Lieberman version of the CAES system in the scenario of the floating power plant where the thick walled steel pressure vessels become the required strong back of the floating platform and also supply the required buoyancy force. Thus integration of the Enis/Lieberman pressure vessels with the barge structure places the Enis/Lieberman CAES system as price competitive and brings along the transportable asset not available to fixed deep underground caverns.

There is also the availability of the surrounding seawater or surrounding sweet-water in contact with the steel pressure vessel that is strongly useful for efficient operation of the thermal heat exchange process that occurs between the steel walls and the expanding air exhausting from the storage tanks to provide a near uniform air temperature delivery to the turboexpander in the turboexpander/generator set.

The conventional safety factor for pressure vessels of a factor of 4.0 for above ground tanks in the areas where there are personnel in the area may be reduced when the pressure vessel is (1) Under water and (2) Away from personnel that will not potentially experience air blast or high speed flying steel fragments. This is another important cost savings factor.

Enhanced Performance of Turbocompressor-Driven Generator Sets

The basic theory of inlet air cooling for gas turbines is simple enough. Combustion Turbines (CT) are constant volume machines—at a given shaft speed they always move the same volume of air—but the power output of a turbine depends on the flow of mass through it. That's why on hot days, when air is less dense, power output falls off. By feeding cooler air into the CT, mass flow is increased, resulting in higher output.

Another factor is the power consumed by the CT's compressor. About $2/3$ of the combustion energy is used by the CT and the remaining $1/3$ of the combustion energy is used to generate electricity. The work required to compress air is directly proportional to the temperature of the air, so reducing the inlet air temperature reduces the work of compression and there is more work available at the turbine output shaft.

Many technologies are commercially available for Turbine Inlet Cooling (TIC). These Technologies can be divided into the following major categories or groups: Evaporative: wetted media, fogging, and wet compression/overspray; Refrigeration: mechanical and absorption chillers without or with thermal energy storage (TES); Special Application Technologies i.e., re-vaporization of liquefied natural gas (LNG); and Hybrid Systems: a mix of mechanical and absorption.

The above systems typically reduce the intake air temperature to no less than 44' F. to avoid icing in the turbocompressor blades first stage of compression. All technologies listed above have advantages and disadvantages. We move the $+59°$ F. and $+44°$ a F. to $-22°$ F. for enhanced performance chillers.

Many published articles are available on these technologies. Many Combustion Turbine (CT) plants across the U.S. and around the world are using various TIC technologies that improve their performance and economics. A database of some of these installations is available in the Experience Database section of the Turbine Inlet Cooling Association website.

The super-chilled air from the Compander, T-CAES system, TL-CAES system a or UW-CAES underwater system fed to the Turbo-compresor will use 30% less natural gas to produce the same amount of electricity.

There is a strong enhanced performance of turbocompressor-driven generator sets introduced by reducing the turbo compressor input air temperature from +−100° F. to −59° F. or to +44° F. as is done for many generator sets. In the patent disclosure herein it is proposed to further reduce the air intake temperature to −22° F. Many of the commercial Gensets are already tested at −25° F. for use in arctic regions.

The Turbo Compressor Generator (TCG) Set consumes 30% less natural gas to generate the same electricity when it is operated at the proposed −22° F. rather than at the typical power plant enclosure at +100° F. The cold dense air will combust with the natural gas and allocate more energy to the production of electricity and less energy to drive the turbine. The current state of the art for many facilities is to cool the Turbo Compressor intake air from +100° F. down to +59° F. and sometimes down to +44° F. using water. This lowering of inlet air temperature reduces the consumption of natural gas. LRA proposes to drop the intake temperature down to −22° F. where the Turbo Compressor is already designed for arctic operation at −25° F. and to thereby save use of natural gas in hot and temperate climates.

The acceptance of −22° F. intake air by a combustion turbine driven Generator Set has been demonstrated by the Caterpillar Company, Solar Turbine Model MARS 100 (~11 MW) system.

Military standard MIL-STD-810 standard describes environmental management and engineering processes that is of enormous value to generate confidence in the environmental worthiness and overall durability of a system design. Mil-Std-810 G, Method 502.5, entitled, Low Temperature Testing: Environmental Engineering Considerations and Laboratory tests, Part One Annex C, Table C-I, "Summary of Climatic Conditions and Daily Cycles of Temperature, Solar radiation, and Relative humidity" specifies that the military requires −25° F. for vendors to qualify for arctic "cold" environments.

Thus the system presented herein places no additional mechanical stresses on Genset hardware. The MARS 100, Titan 130 and Centaur 40 and other Gensets have already been tested for their guaranteed performance during their Mil-Std-810 G, Method 502.5 Low Temperature Testing.

Note that typical power plant facility buildings are often at 100° F. even though the outside ambient temperature is 70° F. Baldor Generators, 3815 Oregon Street, Oshkosh, Wis. 54902 recommends that when evaluating performance of their Gensets assume room ambient of 100° F. This conforms to inventor Paul Lieberman's personal experience when he toured the power plant facility at University of California, San Diego campus. The comfortable 65° F. ambient temperature at that seaside location still resulted in sweating i an indoor environment of the order of 100° F. The HVAC and generator coolant system were not effective in handling the waste heat output from the more than 28,000 kWe turbo generators.

Eutectic Freeze Crystallization Via the T-CAES System for Desalination.

With fresh water becoming more and more in demand, the use of desalination systems become more attractive. For example, for San Clemente Island it costs almost as much to deliver water by barge to the island as it does to deliver the fuel to power the island. Eutectic Feed Crystallization (EFC) is more robust than the typical reverse osmosis desalination technique when there are severe pollutants in the water. Eutectic Freeze Crystallization has been developed for purifying not only saltwater but water runoff from pig farms and from waste water drained from radioactive piles. The Dutch (NIRO) has pioneered the basic parameters of the process and Canadian researchers have applied EFC purification to severely polluted drain water.

The Dutch NIRO company has perfected a EFC process using refrigeration systems, refrigeration coils and scrapers. Their refrigeration temperatures are relatively warm (just below the freezing point of salt water) and when compared to the −170° F. to −180° F. air temperatures that reside alongside a spray of seawater droplets that are flash frozen so that when they are deposited at the bottom of the spray column, the fresh ice water floats above dense brine. The disadvantages of the refrigeration coils and scrapers are eliminated in the spray chamber version of Eutectic Freeze Crystallization.

One approach is to feed the air intake of the turbocompressor of the Genset via an educator that sucks in ambient air (~+100° F.) and mixes the turboexpander exhaust air (~−180° F.) to supply dry air at −22° F.

The other approach is to feed the turboexpander exhaust air (~−180° F.) to a salt water spray chamber to generate fresh water along with a continuous flow of air at −22° F. This air may contain ice fragments that need removal by centrifugal forces available by placing a double bend pipe setup in the path of the particle laden air so that only dry −22° F. air is supplied to the Genset air intake. The centrifuge will remove and save the large ice particles, while the safe and useful small ~10 microns diameter particles will be permitted as intake to the combustion turbine. The small 10 micron diameter ice particles track the air flow between the high speed compressor turbine blades doing no impact damage but actually vaporize and further cool the intake air to enhance its compressor efficiency.

Integrated on-Shore Green Power Sources with Compressed Air Energy Storage System Aboard a Floating Power Plant The floating power plant aboard a barge contains turbocompressor driven electricity generators, smoke stacks with waste heat recovery boiler and silencer, electricity power output control equipment, step-up transformers, control room and administration facilities. There is also storage space for oil and fuel. All these facilities are located on a floating barge with airtight compartments below the deck to provide buoyancy.

A typical 72 MW Floating Diesel Power Station is about 180 feet long, 100 feet wide and 16 feet deep. The barge is must navigate through waters greater than 10 feet depth.

If the Enis/Lieberman CAES system is integrated into a barge design, all the placed pressure vessels will be placed the barge deck to provide the required stored high pressure air volume and to also supply the strong back for the barge structure and to supply most of the buoyancy force.

In a completely green scenario, the barge would be located offshore adjacent to a wind farm or a solar photovoltaic farm where these farms are designed oversized to the immediate power demand. All the excess electrical power would be fed to the barge via power lines as long as the winds and/or sun power supplies are active. The electrically powered multistage air compressor, air mass control valve, turboexpander/generator set, electric power conditioning equipment, air ducting for the high mass flow of super-chilled air and cold storage facilities are on deck. The net product is electrical power, high mass flow of super-chilled air and hot water.

In a partially green (hybrid) scenario #1, the barge would be located offshore adjacent to a wind farm or a solar photovoltaic farm where these farms are designed oversized to the immediate power demand. All the excess electrical power would be fed to the barge via power lines as long as the winds and/or sun power supplies are active. The electrically powered multistage air compressor, air mass control valve, turboexpander/generator set, electric power conditioning equipment, air ducting for the high mass flow of super-chilled air, educator, centrifuge ducting and turbocompressor Genset are on deck. The net product is electrical power, hot water and reduced consumption of natural gas.

In a partially green (hybrid) scenario #2, the barge would be located offshore adjacent to a wind farm or a solar photovoltaic farm where these farms are designed oversized to the immediate power demand. All the excess electrical power would be fed to the barge via power lines as long as the winds and/or sun power supplies are active. The electrically powered multistage air compressor, air mass control valve, turboexpander/generator set, electric power conditioning equipment, air ducting, desalination facility, centrifuge ducting and turbocompressor Genset are on deck. The net product is electrical power, desalinated water, hot water and reduced consumption of natural gas.

In a partially green (hybrid) scenario #3, the barge would be located offshore. Compressed air available on the barge powers a compander that uses the compressed air to generate a high air mass flow of super-chilled (−180° F.) air. The coolant water for the two stages of turbocompression in the compander becomes heated. The compander, air ducting, desalination facility, centrifuge ducting and turbocompressor Genset are on deck. The net product is electrical power from the onboard turbocompressor driven Genset, desalinated water, hot water and reduced consumption of natural gas.

For a 180 feet long and 100 feet wide barge deck it is anticipated that there will be a manifold that connects a set of about 25 pipes in the uppermost layer of pressurized pipes and as many as 4 layers of these pipes. If the barge is to operate in very shallow waters, the length of the pipes will be doubled and the layers will be halved.

The multi-layered bank of high air pressure pipes will not only supply the strong back basis for the structure of the barge, but also supply much of the buoyancy requirements.

The Enis/Lieberman version of the Compressed Air Energy Storage (CAES) system uses high air pressure, thick steel wall, pipes to store its compressed air. Green power (wind and/or solar) sources or commercial grid electric power source to drive a multi-stage air compressor when the green power is available or when the commercial power is less expensive that pressurizes a pressure vessel. At a later time, when this stored energy is required the pressurized air is metered via an air mass control valve to drive the turboexpander of a turboexpander/generator set to generate electricity. Since there is no fuel combusted the pressurized air flow input at near room temperature exhausts a high mass flow of super-chilled (−180° F.) air. This super-chilled air can simply be used for HVAC or for cold storage facilities. Or this super-chilled air can be used to reduce the fuel consumption of a nearby turbocompressor driven Genset by as much as 30%. Or, in a more advanced version, this super-chilled air can be used to desalinate saltwater or brackish water and to also reduce the fuel consumption of a nearby turbocompressor driven Genset.

One of the factors limiting the Enis/Lieberman version of the Compressed Air Energy Storage (CAES) system is the payback period after the system installation. The Time-Of-Use schedules dictate payback periods of 5 to 7 years depending upon the city utility rates as to daytime versus night time and summer time versus winter time. The major contributing factor is the cost of the thick steel wall pressure vessels required for the energy storage.

In the barge scenario for the floating power plant the expense associated with the construction of the barge itself with all its submerged air compartments will be shared with the construction of the Enis/Lieberman CAES system pressure vessels. Thus the payback period for the Enis/Lieberman CAES system is reduced to 3 to 5 years. Also the fundamental cost of power for many of the island and isolated locations is about three-fold more expensive than populated areas so that payback periods are further shortened.

The deep underground cavern CAES systems not only are geographically and geologically limited but they have long study periods and long installation periods associated with 5 to 10 years. This compares to typical FPP and Enis/Lieberman CAES system installation period of less than 1 year.

Not only does the Enis/Lieberman CAES system versus the cavern system avoid burning fuel in its generation of electricity but also has high mass flow of super-chilled air output that reduces the fuel consumption of nearby turbocompressor driven Gensets.

The isolated locations of these islands also have greater use of refrigeration facilities for their fish processing and storage facilities. The high mass flow of superchilled air from the turboexpander exhaust is of immediate use in that scenario. This all-fresh-air configuration avoids the need for the typical ammonia refrigeration facilities that have a history of toxic plume release as the ammonia storage tanks age.

In summary, the integration of the FPP and Enis/Lieberman CAES system creates a portable (shippable) facility for delivering electric power and high mass flow of super-chilled air to remote locations in a short installation time and with reduced need for fuel combustion. There is also the potential to introduce desalination as a step in the overall process. Payback periods in isolated areas where energy cost rates are high will result in payback periods less than 3 years. It is the integration of the cost of the barge construction and the pressure vessel construction that permits these advantages.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 3 is a table illustrating temperature drops, according to an embodiment of the present invention, FIG. 4 is a table illustrating turbine data, according to an embodiment of the present invention.

Figure 1:
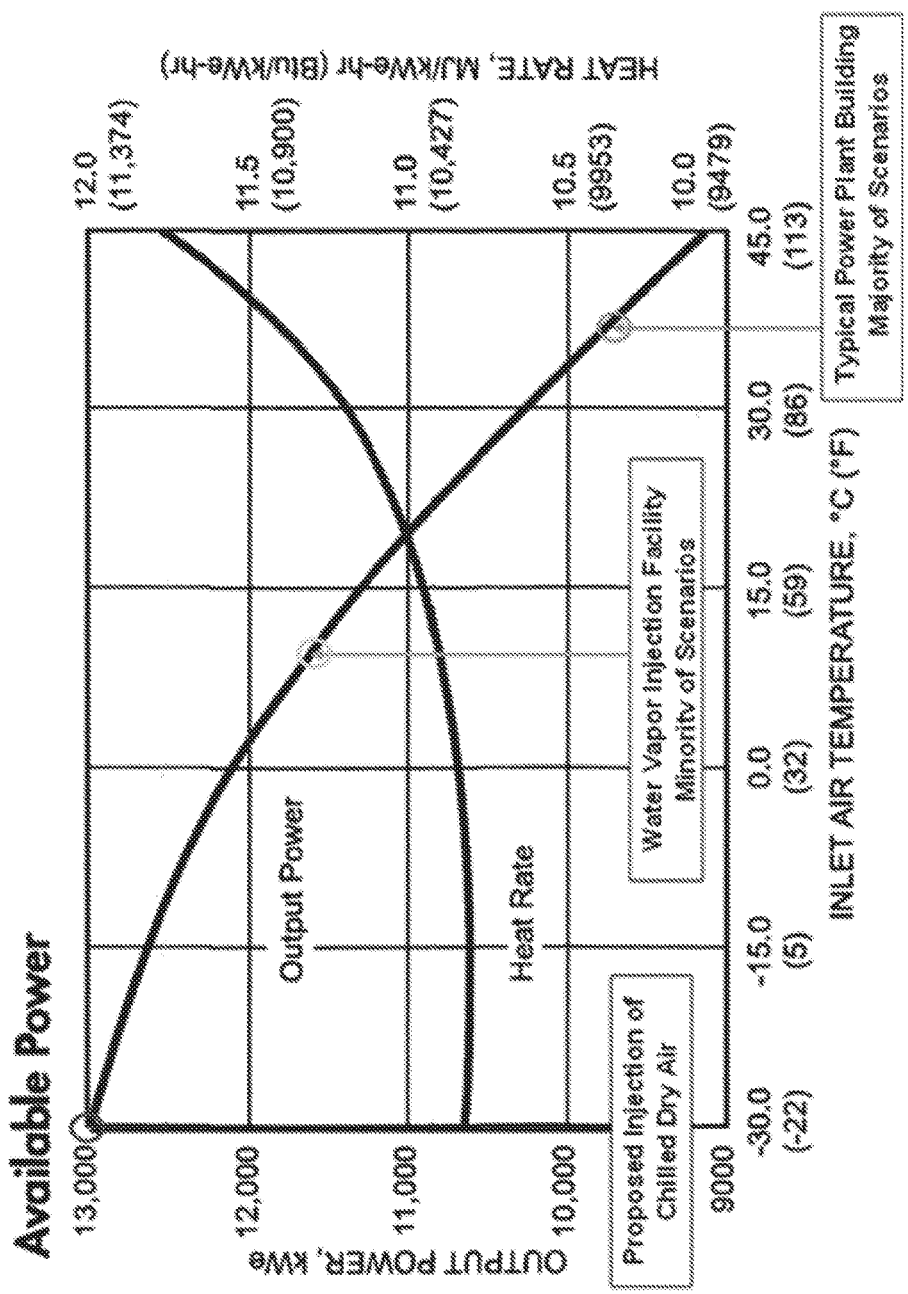
FIG. 1 illustrates a graph comparing inlet temperature, output power and heat rate, according to an embodiment of the present invention.

There is also the configuration wherein the chilled air is used directly to chill a cold storage facility as well supply more electricity. One variation is to supply chilled air to a cold storage facility without the supply of electricity.

DETAILED DESCRIPTION OF PERFERRED EMBODIMENTS

Preferred embodiments of the present invention and their advantages may a be understood by referring to FIGS. 1-13, wherein like reference numerals refer to like elements.

The following discussion contains a narrative of the invention that integrates the CAES system and its variations with the FPP system. The narrative is followed by a calculation that sizes a specific system as an example.

The electric utility supply power system is comprised of (1) Transportable Compressed Air Energy Storage (T-CAES) system and its specific versions described herein and (2) Floating Power Plant (FPP) barge.

The Enis/Lieberman Compressed Air Energy Storage (CAES) system uses either commercial power from the grid when the T-O-U schedule is to our advantage or uses green power to drive a multistage air compressor to pressurize the air in the pressure vessel wherein the energy is stored for later usage. The impeller wheel of the turboexpander is shown in an exploded view. The turboexpander drives the electric generator to produce electricity at the time it is demanded and as a byproduct it exhausts useful high mass flow of superchilled air.

1. Transportable Compressed Air Energy Storage (T-CAES) System

FIG. 1 describes the Enis/Lieberman Compressed Air Energy Storage (CAES) system that uses either commercial power from the grid when the T-O-U schedule is to our advantage or uses green power to drive a multistage air compressor to pressurize the air in the pressure vessel wherein the energy is stored for later usage. When the energy is needed, the air mass control valve releases the pressure in the pressure vessel and feeds the steady high mass of near room temperature air to the input of a turboexpander impeller wheel (shown in an exploded view). The expansion process in the two-stage turboexpander releases the compressed air to the ambient pressure at very low temperatures (minus 180° F.). The torque from the turboexpander/impeller wheel drives the electricity generator. A complete 2.5 MW turboexpander/generator system is shown on its shipping pallet.

A schematic of the basic transportable compressed air energy storage (T-CAES) system is comprised of: Electrical power source: Green Energy, Wind Turbine(s), Photovoltaic solar panel(s), Other; Waste Energy Power Plant; Utility Electric Power Grid during the Inexpensive periods of Time-Of-Use; Multi-Stage High Air Pressure Compressor; Multi-Stage for high efficiency; Lowest acceptable thermodynamic efficiency at 2.0 SCFM/HP; Water cooled for recovery of waste heat; Hot water condensed within the compressor from the moist air will be collected for recovery of waste heat; More than one compressor, each efficient for the available input power when input electric power is not steady; Pressure Vessel; Air pressure sufficiently high to condense most of the moisture in the input air to prevent icing in the turboexpander and to reduce the area footprint; Thick steel walls to safely contain internal high air pressure, to contain sufficient thermal capacity to supply the required heat to continuously warm expanding air as it is exhausted from the pressure vessel; Internal and external surface area designed to be sufficiently large to permit the required heat transfer into and out of thick steel walls; Air mass control valve will deliver a constant air mass flow to the input of the turboexpander will adjust the output pressure for the slow decrease in air temperature received from the pressure vessel and no fuel for combustion is added! Turboexpander with no more than 100 psig as input to a one-stage turboexpander because of flow separation on the impeller blades and no more than 200 psig as input to a two-stage turboexpander because of flow separation on the impeller blades. An electricity generator. The electricity generator is driven by the shaft of the turboexpander. Water coolant water will be passed through a waste recovery circuit. A control system for turboexpander/generator set whereby generated electricity is conditioned for voltage and frequency control and rotational speeds of turboexpander and generator measured for safety cut-off. Also vibration and acceleration sensors are monitored for safety cut-off. Furthermore, air mass flow of turboexpander is monitored as well as, temperature, and pressure. Also a control system for overall T-CAES system. Only excess power from the power source(s) is are used for the compressor and the system shuts down when there is not sufficient demand.

All other available commercial systems burn fuel with the pressurized air from the pressure vessel. Thus these systems generate electricity and an exhaust of high mass flow of hot combustion gases.

This T-CAES system does not burn fuel with the pressurized air from the pressure vessel. It is unique in this characteristic. Thus the T-CAES system generates electricity and an exhaust of high mass flow of super chilled air. It is the use of this super chilled air that results in the following two families of useful power systems: (1) Green and (2) Hybrid.

The green (wind, solar, geothermal . . . ) systems use no fuel. The high mass flow of super chilled air from the turboexpander exhaust is fed to HVAC or cold storage facilities or to desalination facilities.

Figure 2:
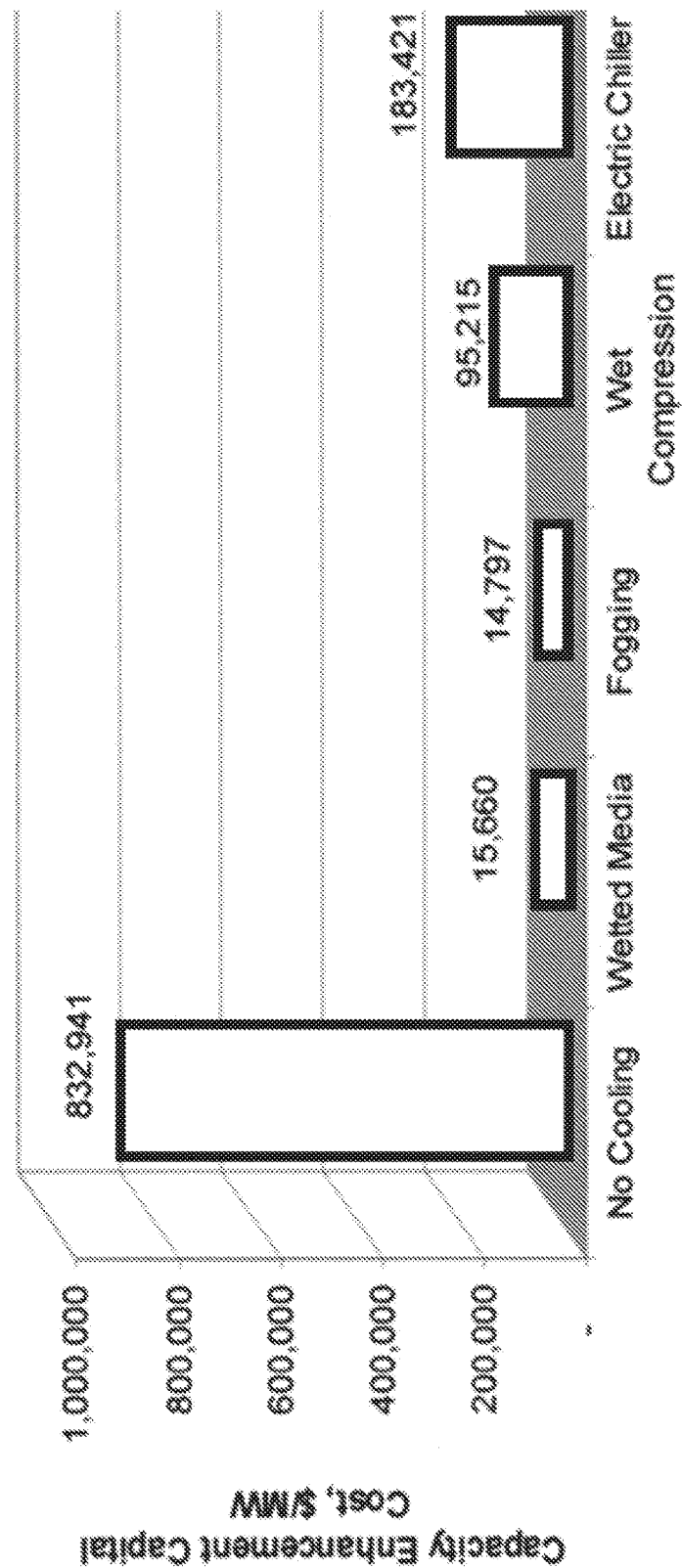
FIG. 2 illustrates a chart of cost benefit, according to an embodiment of the present invention.

The hybrid system burns fuel in its last step in the power system process. The last step is the fuel driven turbocompressor generator set that generates more and more electricity with colder and colder air intake. Many commercial systems already use water vapor systems and refrigeration to bring high ambient air temperatures down to about 59° F. to produce more electricity for the same fuel consumption (FIGS. 2 and 3). In this invention we have the advantage of bringing 100° F. ambient air temperatures down to −22° F. or for a temperature change of 122° F. (FIG. 4).

When there is no wind or no sun a community will still need its electric power. The hybrid system provides reduced use of fuel when the natural power sources are strong or when the pressure vessel is not on empty. On the other hand, the hybrid system uses its planned fuel consumption when the natural power sources are weak or when the pressure vessel is on empty.

FIG. 1 shows the performance chart for the Caterpillar Company, Solar Turbine Division, MARS 100 Genset driven by natural gas. At the high ambient air temperature intake the Genset produces only 9,200 kW of electricity. Commercial air intake coolers attempt to supply the denser air associated with 59° F. (10,300 kWe) or even denser air at 44° F. (11,000 kWe). The patent concept disclosed herein will supply air at the −22° F. (13,000 kWe) that the Genset is capable of achieving as demonstrated during its Mil Std Environmental tests at −25° F.

FIG. 2 shows the cost savings for four different commercial inlet air cooling systems. These cost figures were developed in the presentation entitled, "Effect of Turbine Inlet Air Cooling Technology on Capital Cost for Incremental Capacity". This chart was for the 317 MW Cogeneration System Snapshot at 95° F. Dry Bulb and 80° F. Wet Bulb Ambient Air Temperature as reported by Punwami et al ASHRAE Winter Meeting, January 2001.

FIG. 3 show that the physics of water evaporation controls the limit of the available commercial systems. If the ambient air is 100° F., the 15° F. and 25° F. temperature drops result in air intake temperatures are 85° F. and 75° F. that do result in enhanced electrical power output. If the ambient air is 100° F., the 45° F. temperature drop results in air intake temperatures are 55° F. that does result in more enhanced electrical power output.

On the other hand, if the ambient air is 100° F., the 122° F. temperature drop results in air intake temperatures are −22° F. that does result in most enhanced electrical power output . . . by a large margin!

FIG. 2 shows that many commercial turbocompressor driven Gensets are already tested to Mil Std Environmental Cold Climate test operation at −25° F. Thus there are no questions as to the ability of the commercial system to perform at this temperature and produce more electricity without degrading any of the internal components.

Figure 5:
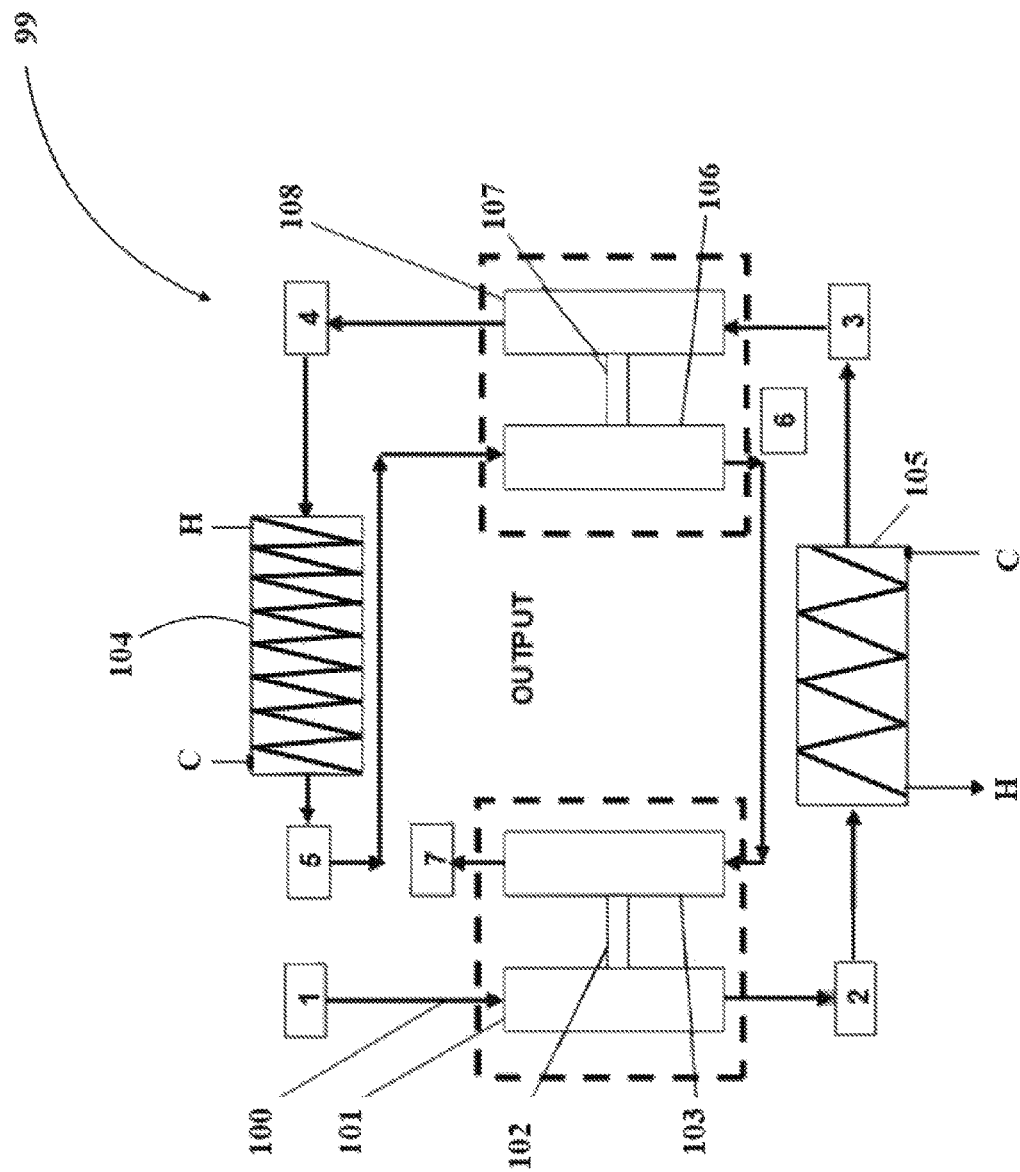
FIG. 5 shows a schematic of a compander, according to an embodiment of the present invention.

FIG. 4 shows examples of the superchilled air temperatures in the exhaust of several turboexpander configurations. The first row shows the cold temperature value (−104° F.) attained in a typical single stage turboexpander/generators. FIG. 5 shows the air temperatures from the exhaust of a turboexpander impeller wheel. For one stage of air expansion it is only possible to drop from 114.67 psia (100 psig) to 19.67 psia (5 psig) and avoid flow air flow separation from its channeling impeller blades. At about 85% thermal efficiency the expansion results in the intake air at 100° F. to expand to −104° F.

FIG. 4 shows the second and third rows show the cold temperature value (−56° F. after first stage and −104° F. after second stage) attained in a typical two stage turboexpander/generators. There are a multitude of companies that produce these generators. Turboexpander/generator sets generate both electricity and super chilled air from a high pressure air input. For two stages of air expansion it is only possible to drop from 300 psia to 85 psia and avoid flow air flow separation from its channeling impeller blades in the first stage; to drop from 80 psia to 15 psia and avoid flow air flow separation from its channeling impeller blades in the second stage. At about 85% thermal efficiency the expansion results in the intake air at 77° F. to expand to −181° F.

FIG. 4 also shows examples of the superchilled air temperatures in the exhaust of a typical two-stage, free spooling compander. The last two rows show the cold temperature value (−82° F. after first stage and −174.5° F. after second stage) attained in a typical two stage free spooling compander. There is now only one company in the USA and the other in France that produce a compander. The compander does not generate electricity only super chilled air from a low pressure air input.

In the above examples of commercial turboexpander/generator sets that are available in the 100 kWe to 40 MWe both electricity and a high mass flow of super chilled air are generated.

In the case where there are two stages of turbocompression followed by two stages of turboexpansion via connection of a specific turbocompressor and turboexpander coupled to each other at one rotational speed and another specific turbocompressor and turboexpander coupled to each other at another rotational speed we have the creation of a two-stage, free-spooling, compander. The 90 psia and 70° F. intake air is exhausted at 20 psia and −174° F. . . . and there is no electricity generated. Only super-chilled air and hot water are the products. This device is used when there is "house" compressed air available at 90 psia.

FIG. 5 shows the schematic drawing of the internal components of a compander 99. The 90 psia air can be delivered via the T-CAES system pressure vessels or from typical commercial "house" pressurized compressed air. The air initially flows through the path indicated by steps 1 through 7 to start the compander rotating. Thereafter the system of impeller wheels 102 and 107 accelerate until the steady state (free-wheeling) state is achieved.

In step 1, the pressurized air 100 is first fed through the series of turbocompressor #1 101, turbocompressor #2 108, turboexpander #1 103 and then turboexpander #2 106. This forced flow through the series of impeller wheels start the system rotating. Over a short period of time each impeller wheel starts to assume more and more of its own role that it will have at its steady state operation. The enthalpy changes across the dedicated pair of turbocompressor and turboexpander on their common shaft achieve a rotational speed wherein the enthalpies delivered and consumed are matched. This steady state condition is call "free-spooling. The detailed design of the four impeller wheels are designed to handle the same air mass flow throughout the system so that one set of free-spooling turbocompressor and turboexpander will rotate at a different speed than the other set to assure that the increase in enthalpy is matched by the relevant decrease in enthalpy in each rotating set.

The air from the turbocompressor #1 is hot and is cooled prior to its transfer to turbocompressor #2. The air from the turbocompressor #2 is hot and is cooled prior to its transfer to turboexpander #1. Thus the system not only cools input air but also heats output water H. A first heat exchanger 105 and a second heat exchanger 104 transfer heat through thermal conduction of the water, cold C in and hot HI out.

The net results are the temperatures shown in FIG. 4 and also hot water H is generated as a byproduct.

Figure 6:
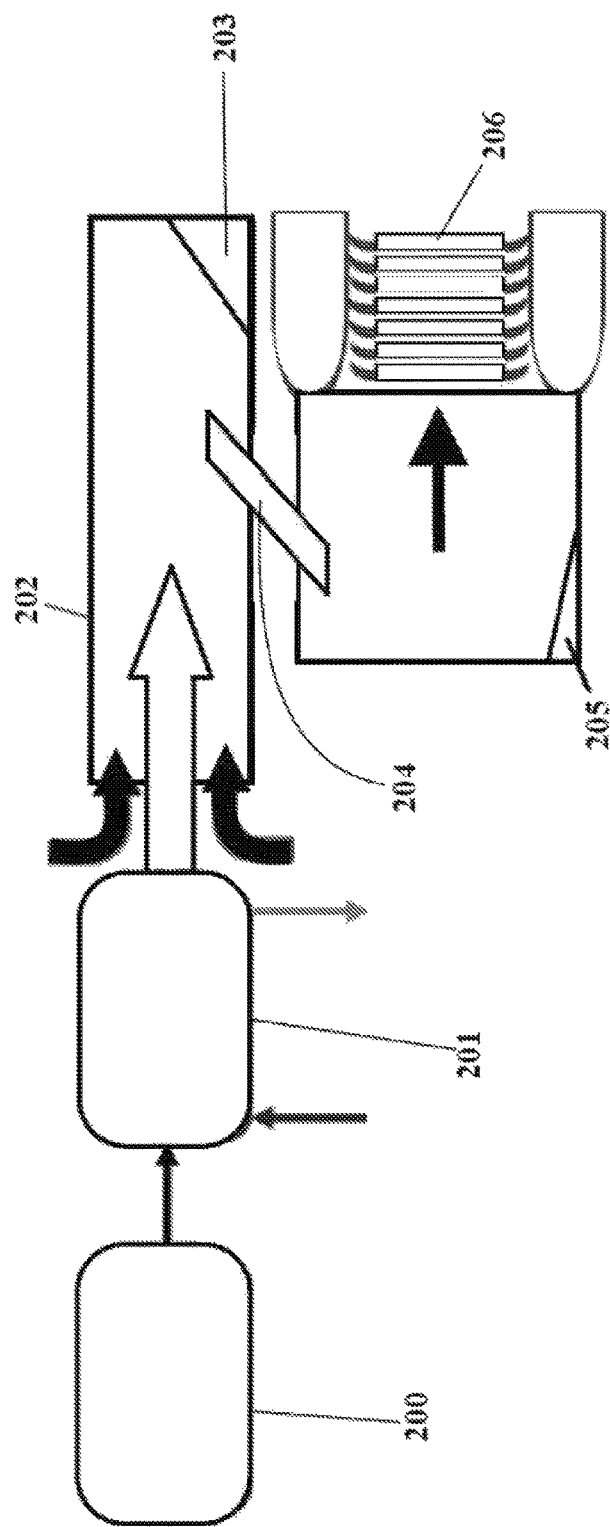
FIG. 6 shows a compressed air energy storage system, according to an embodiment of the present invention.

FIG. 6 shows an example of a barge FPP that EnRevo Pyro has developed for generating electrical power from pyrolysis of waste material. Their "house" air is between 102 and 105 psig (114.67 and 119.67 psia) so that it is more than sufficient than the compander shown in FIG. 4 to obtain even lower air temperatures.

The exhaust air from the compander is above atmospheric and the compressor turbine operates with suction upstream of its first stage of compression. This pressure difference across the educator pipe draws in the hot moist ambient air. After several pipe diameters downstream the mixing is complete between hot moist annular flowing air and the inner cylindrical core of the flowing super chilled compander air. There is then created a mixture of ice particle laden air at −22° F. The mixed flow is forced through two 135 degree bends in the ducting to assure that no large ice particles are fed into the path of the high speed blades of the turbocompressor.

FIG. 6. Shows a compressed air supply 200 in communication with the ACD compander 201, with is temperature controlled by water. The compander 201 is in communication with the eductor 202 and a centrifuge 204 connects the eductor 202 to and ice accumulator 205, which is in communication with a compressor turbine air intake 206.

Figure 7:
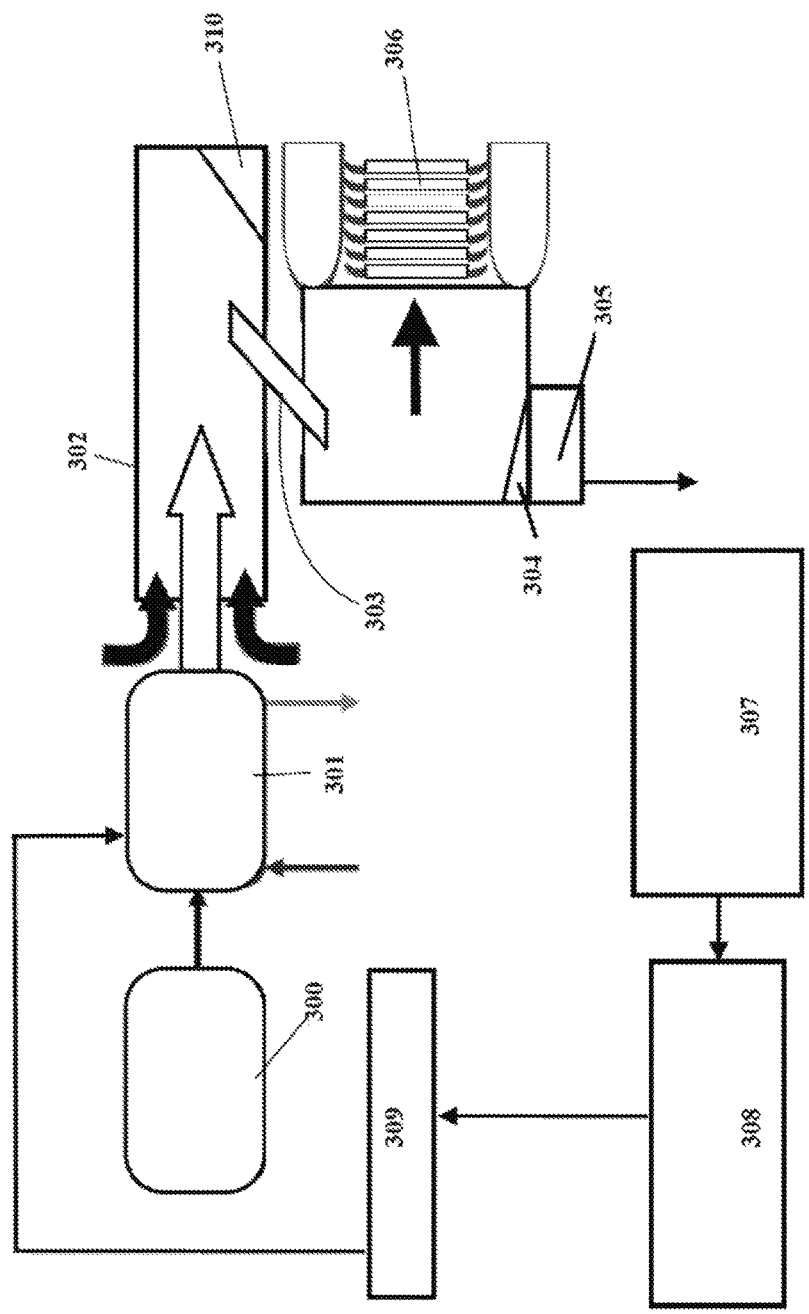
FIG. 7 shows a compressed air energy storage system, according to an embodiment of the present invention.

The large diameter ice particles accumulate and are continuously removed by a process not completely shown in FIG. 6 but is completely shown in FIG. 7.

FIG. 7 shows the complete system wherein the Enis/Lieberman CAES system is integrated with the floating power plant (FPP) barge. In this version of the CAES and FPP integrated system a turboexpander/generator system is powered to generate electricity and to create the high mass flow of super chilled air to be consumed by the turbocompressor driven Genset. The net result is the same electricity power output with a strongly decreased use of input fuel. The net result is thus electricity output from the turboexpander/generator set and electricity output from the Genset.

The accumulated ice is continuously thawed to recover fresh potable water as a product.

The flowing warm water discharged from the multi-stage air compressor cooling system is used to thaw the accumulating ice masses and then returned to again cool the multi-stage air compressor.

The electric power transmission lines and their towers that deliver the electric power from the barge to the island is also used to place power lines from the wind turbine farm and/or solar photovoltaic farm to the barge for powering the multi-stage air compressor.

The multi-stage air compressor pressurizes the steel pressure vessels below the barge deck. It is in these pressure vessels that the incoming power is delivered over time to store its energy as compressed air.

FIG. 7 also shows the transfer of energy from wind turbine farms and/or photovoltaic panel farms 307 to a multistage high pressure air compressor 308 and through a a mass control valve 309 for air delivery. The electric power generator 300 is in communication with the two-stage turboexpander 301 air is then transferred to the eductor 302 and through centrifuge 303 to and ice accumulator 304 where cold water is produced as a byproduct at 305 and the remaining air travels through the compressor turbine air intake 306.

Figure 9:
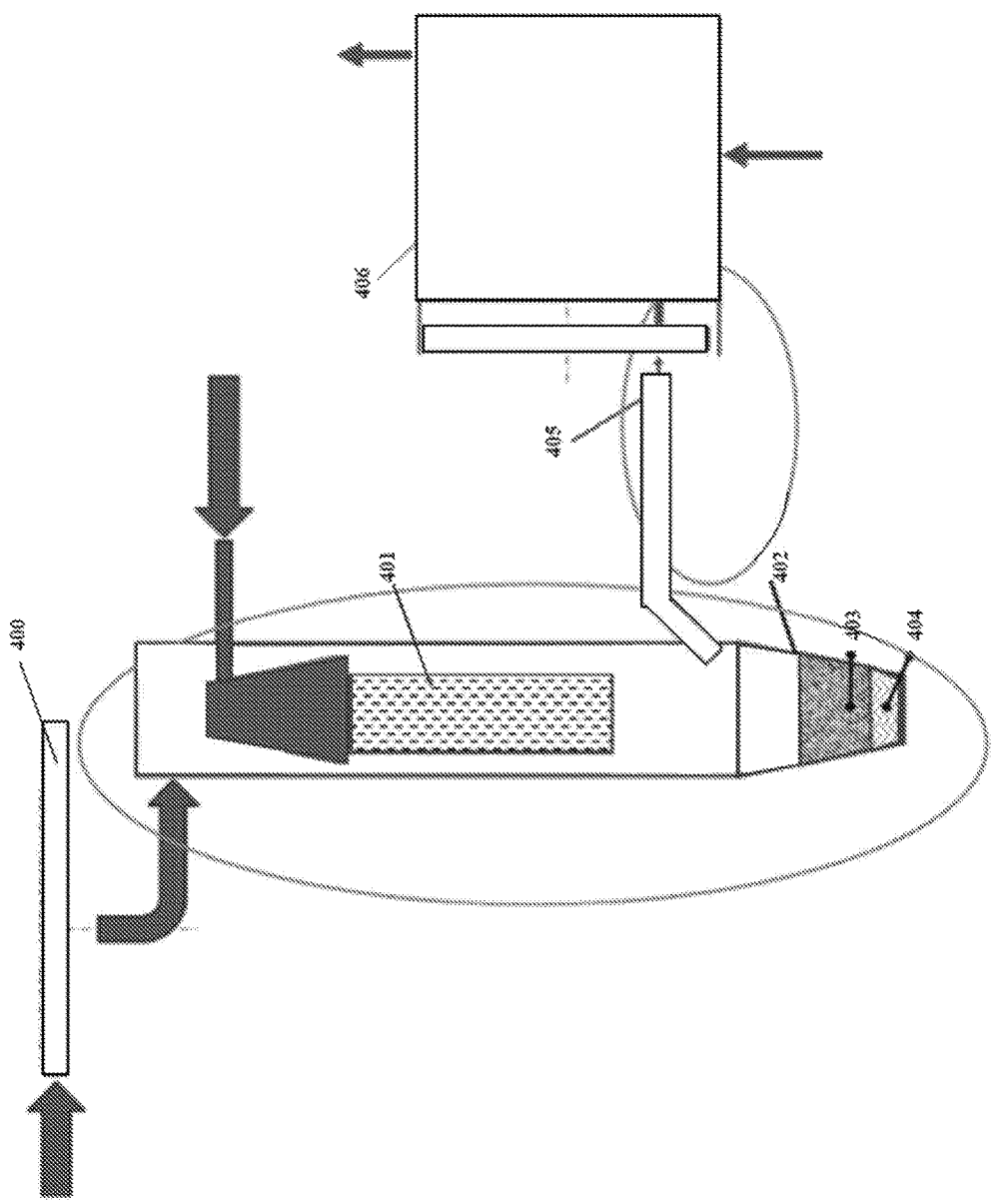
FIG. 9 is a schematic representation of the exhaust processing, according to an embodiment of the present invention.
Figure 10:
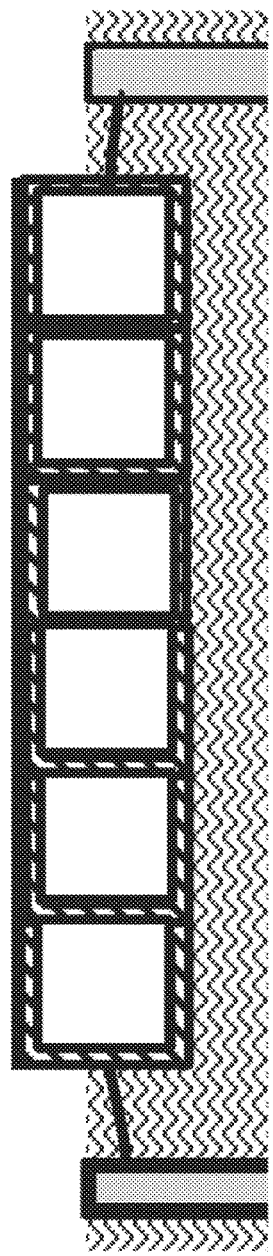
FIG. 10 is a side elevation view of a floating power plant barge, according to an embodiment of the present invention.
Figure 11:
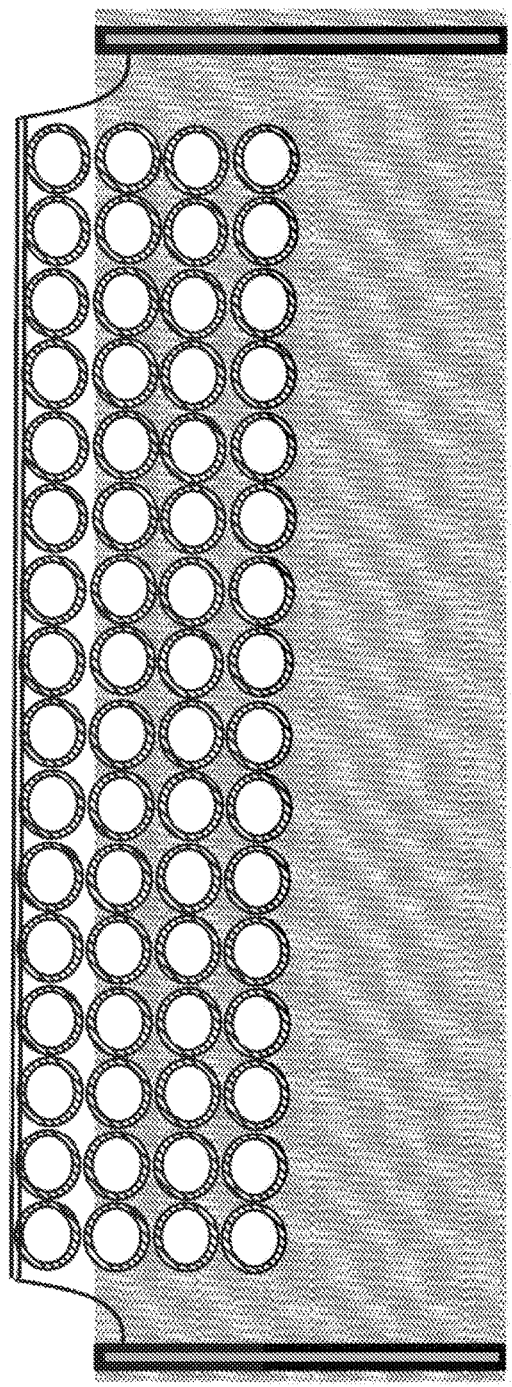
FIG. 11 is a side elevation view of a floating power plant barge, according to an embodiment of the present invention.

The next FIGS. 9 through 11 present details of the components of the hardware mentioned as centrifuge, desalination, compander and layered underwater pressure vessels. Thereafter, FIG. 12 combines all the separate components of the system.

Figure 8:
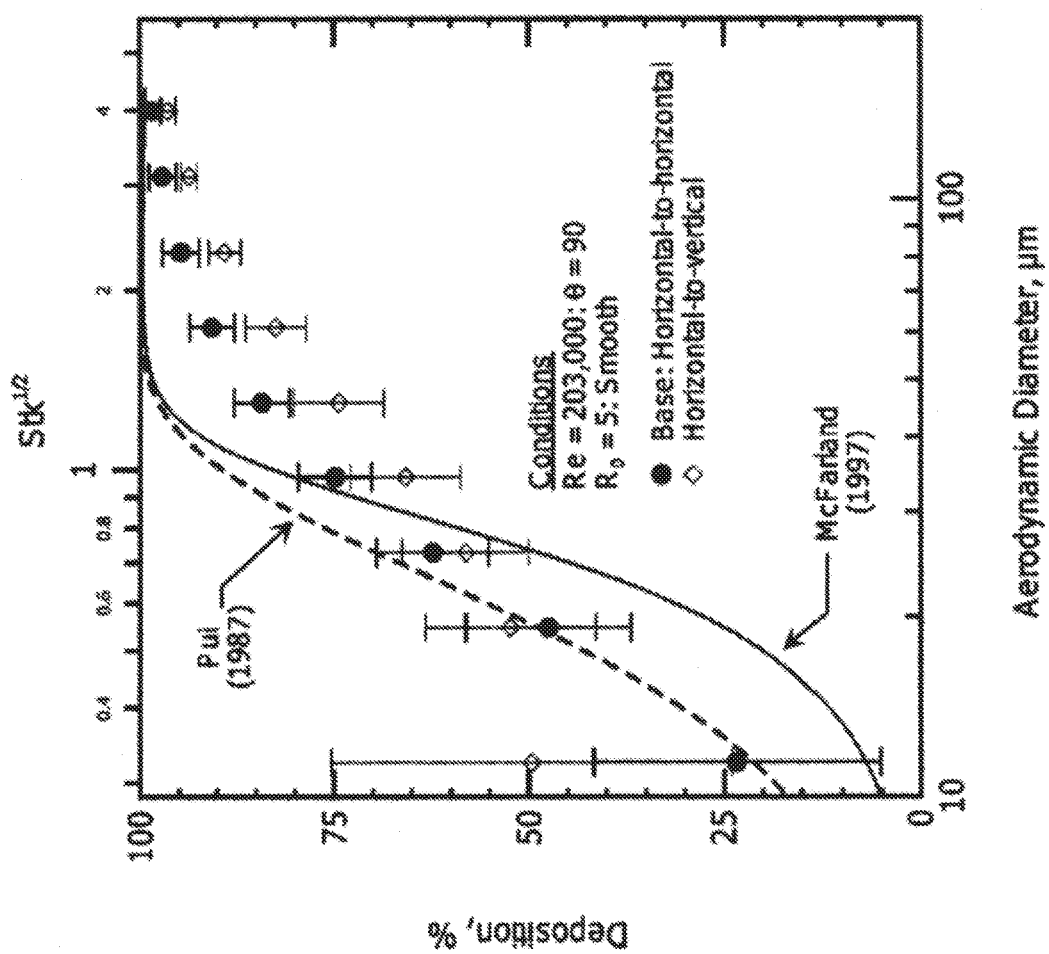
FIG. 8 illustrates a graph of centrifuge efficiency, according to an embodiment of the present invention.

FIG. 8 shows the centrifuge performance in the rejection of the larger glass particles in a specific pipe cross section, air mass flow, pipe cross-sectional area and air temperature after it transits a 90 degree bend in the pipe. The specific spherical diameter of particle is plotted. Although the results are somewhat generalized by the stated values of Reynolds Number and Stokes Number.

For a Reynolds Number of 3 (laminar flow) about 15% of all the glass particles (density of glass is about three times that of ice) were deposited prior to a 90 degree turn in the duct.

We use 135 degree bend that is more severe than a 90 degree bend so that the centrifugal forces are more severe, and we use two such bends.

Another favorable physics effect that we use is that the air pressurized to 1,200 psig in the pressure vessel can support only $3*10-4$ pounds of water per pound of air so that all the water in excess of that is condensed and drained. Note that at even 100% relative humidity the air at 75° F. and 0 psig can support $2*10\hat{}-2$ pounds of water per pound of air. Thus the air from the turboexpander is extremely dry. This mass flow of dry air mixes with the hot humid ambient air prior to encountering the double bend centrifuge.

FIG. 9 Shows the turboexpander impeller wheel from the turboexpander/generator set 400 in communication with the desalination facility having the weawater spray 401 with a settling chamber 402 where ice 403 would accumulate above dense brine byproduct 404. The remaining air travels through at 405 and into the Gen-Set 406 which produces electricity and increases savings on natural gas.

FIG. 9 shows the detailed coupling between the exhaust air from the turboexpander to the intake of the turbocompressor that is combusted with the fuel in the Genset.

The 5,500 pounds per minute of −170° F. exhaust air from the 10,000 kWe turboexpander/generator set is combined with 194 gallons per minute of sweater at 70° F. so that the seawater spray is flash frozen to form a mixture of ice particles and air at −22° F.

The temperature drop for the seawater droplets is extreme (±70° F. to −22° F.) so that the time delay for the freezing process to occur throughout the seawater droplet is short.

Furthermore the pressure drop across the spray nozzle and the diameter of the orifices in the nozzle head are designed to produce a fine particle spray to assure that the resultant ice particles are small in diameter. The dwell time in the desalination chamber is so short that the ice particles have little time to grow in diameter during its downward flight (or fall).

The heavy ice particles accumulate in the hopper at the bottom of the desalination chamber. The high density salt water drains to the bottom and the low density ice floats to the top of the salt water surface. At these low temperatures some of the other salts, other than NaCl, as well as minerals will deposit as solid particulates at the bottom of the brine solution. These materials are continuously collected by any of several commercial separation processes.

The turboexpoander/generator and/or compander system supply of high mass flow of super chilled air to a desalination chamber provides Eutectic Freeze Crystallization (EFC) of seawater or brackish water at such an extreme temperature difference that desalination occurs over a shorter residence time and over a smaller path so that a smaller facility is possible compared to the conventional refrigeration coils systems. Furthermore, there are no scraper coils in the disclosed desalination system as is used in conventional refrigeration systems.

The −22° F. air, free of large ice particles, is fed to the turbocompressor that drives the Genset.

Note that a 10,000 kWe turboexpander/generator set fed sufficient cold air to produce 22,700 kWe from a pair of MARS 100 Gensets at a 30% fuel savings . . . plus 194 gallons per minute of seawater desalination.

2. Floating Power Plant (FPP) Barge

A typical 72 NMW Floating Diesel Power Station is about 180 feet long, 100 feet wide and 16 feet deep. The barge is must navigate through waters greater than 10 feet depth. There are more than 60 floating power plants (FPPs) operating around the world.

The objective is to consider that the strong back and the floatation systems of these FPPs (FIG. 11) provide an excellent opportunity to hide the cost of the high pressure compressed air storage (CAES) system pipes as part of the strong back and floatation system of the FPP. Thus the most expensive portion of the T-CAES system is thereby excluded from the cost of the T-CAES system and its payback period shrinks from 5 to 7 to 11 years (depending upon Time-Of-Use schedules of a particular utility) to 3 to 5 to 7 years.

FIG. 10 is the end view of an actual FPP barge floatation arrangement. This arrangement supports a 72 MW power plant that includes all the necessities of generators, smoke stacks, smoke stack scrubbers, heat recovery system from the smoke stack, electric power conditioning equipment, lubricant oil storage, fuel storage, compressed air system, administration offices, sewage tanks, ballast tanks, etc.

FIG. 11 is the end view of the FFP barge flotation arrangement using layers of an array of high air pressure cylindrical pipes. These pipes are connected via a manifold that feeds compressed air into the pipes and later exhausts air from the pipes.

This view shows the barge when it is not heavily loaded down with much of the required stored liquids and gases. When fully loaded it is desired that all the pipes be under water for efficient heat exchange operation of the CAES system. Thus it is expected that additional flotation will be provided between the deck and the pipes. This flotation will be constructed of less costly materials.

For operation in depths less than 20 feet deep, it will be necessary to use a barge twice the shown length and half the number of pipe layers.

Figure 12:
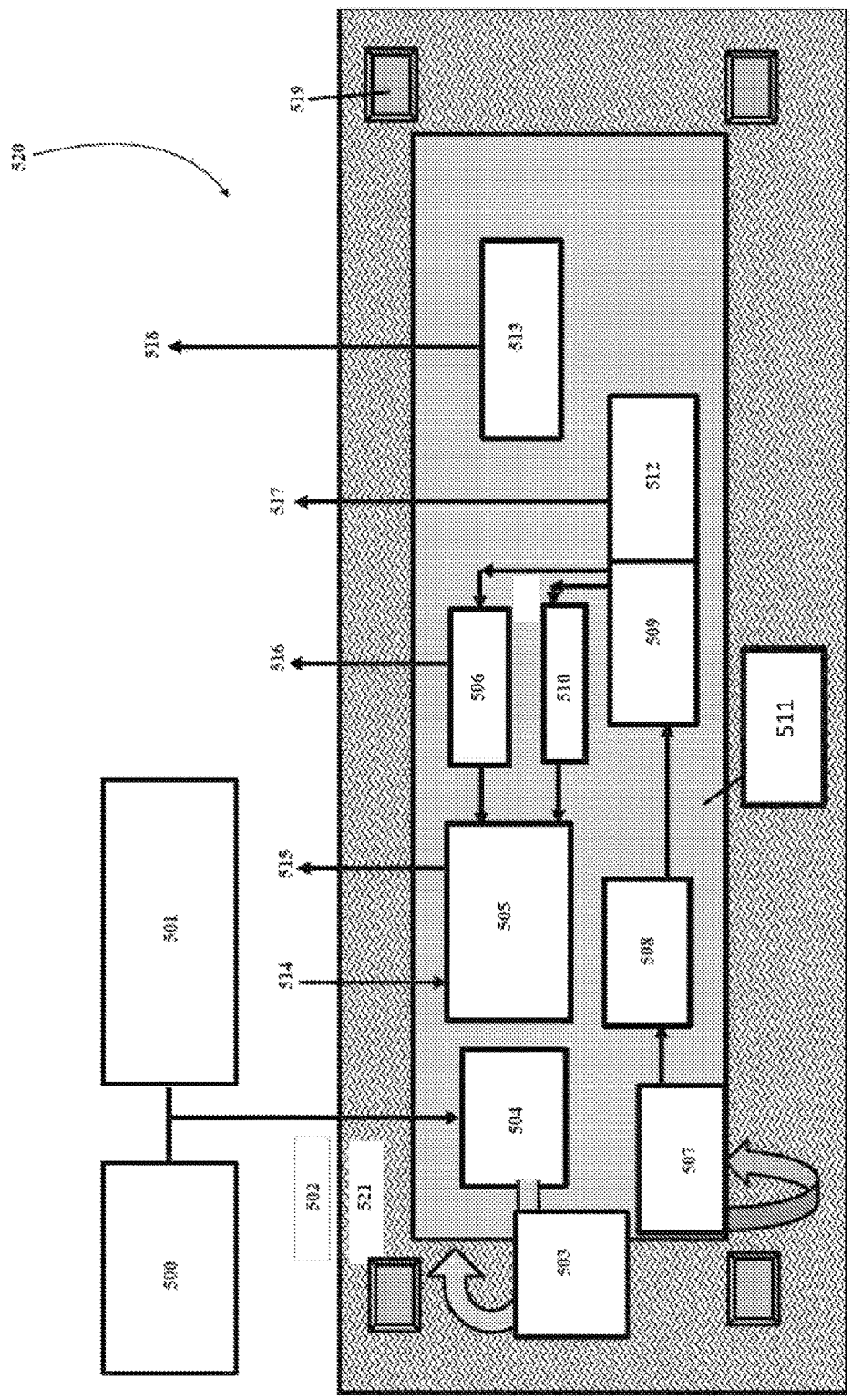
FIG. 12 is a compressed air energy storage system, according to an embodiment of the present invention.

FIG. 12 shows operation of the complete integration of the CAES system and the FPP 520 system to provide electrical power at remote sites adjacent to waterways. This system is shippable to another site when needed.

There are additional components that provide desalination and less use of fuel in turbocompressor driven Genset.

There is also the configuration wherein the chilled air is used directly to chill a cold storage facility as well supply more electricity. One variation is to supply chilled air to a cold storage facility without the supply of electricity.

FIG. 12 shows the compressed air energy system on the barge as part of a floating power plant 520. Energy from wind turbine farms with excess turbine power 500 and from solar photovoltaic panel farms with excess panel power 501 power the multistage air compressor 504 which is in communication with high pressure vessels 503 below the deck of the barge. The air mass flow control valve 507 is in communication with another mass flow control valve 508 controling air flow to the 2-stage turboexpander 509 in communication with the electricity generator 512 which results in electricity product output 517. The 2-stage turboexpander is also in communication with the eductor 510 or the EFC desalination 506 both of which direct air to a natural gas driven multistage turbocompressor generator set 505. The turbocompressor generator set 505 produces electricity 515 with reduced natural gas inflow product 514. Mooring pylons 519 hold the barge in place. Finally, other electricity generator sets 513 also produce electricity products 518.

The barge is shown near the shore 502 but offshore 521.

Figure 13:
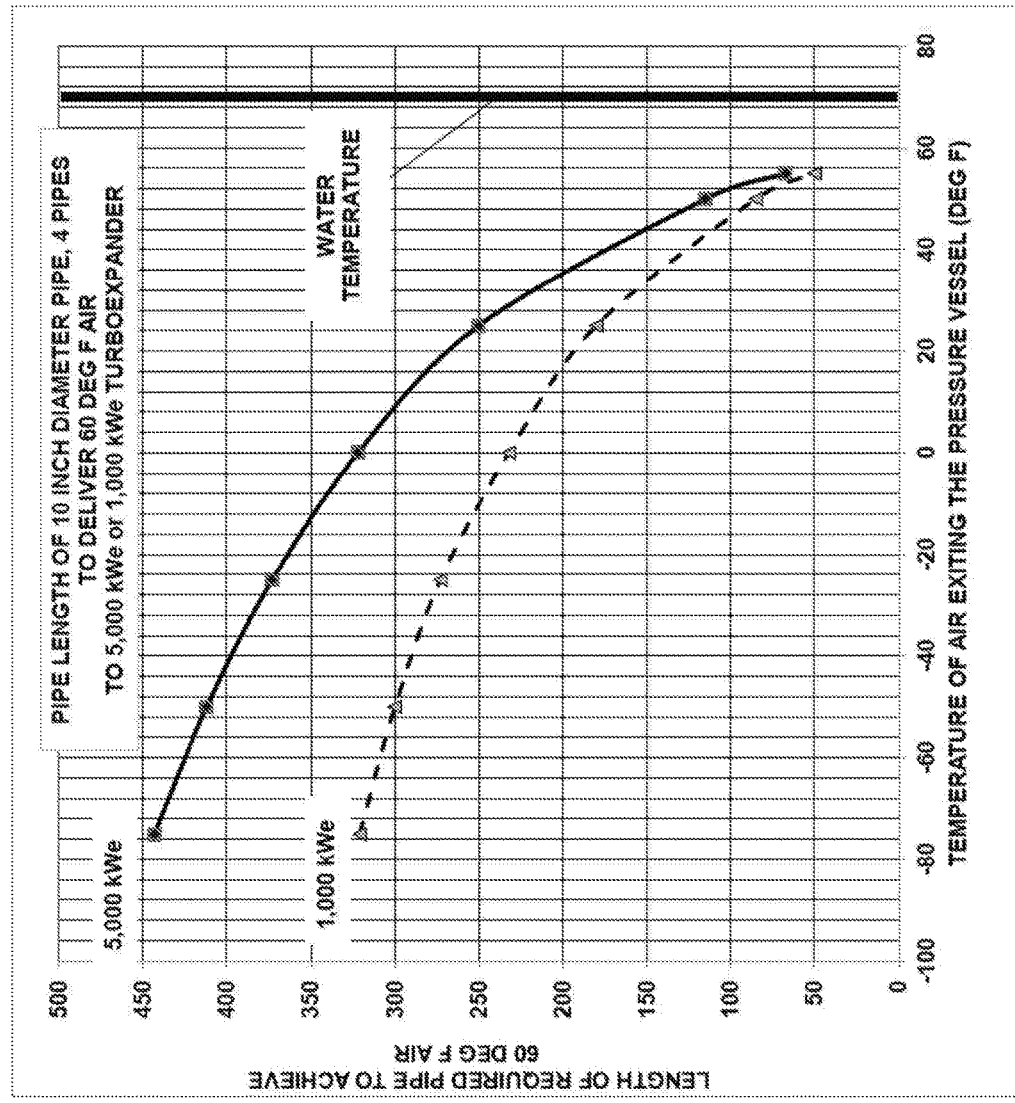
FIG. 13 is a graph of pipe length, according to an embodiment of the present invention.

FIG. 13 considers the steel wall pressure vessels considered in the CAES systems discussed in this disclosure. The thick steel wall not only contains sufficient heat capacity and high thermal diffusivity in the metal mass to supply the heat required by the expanding compressed air exhausting from the fixed volume storage pressure vessel so that the discharged air does not drop excessively in air temperature prior to arrival at the turboexpander input port. This temperature drop limit is further sustained by the presence of the steel pressure vessels direct contact with the water under the barge.

However, there are sites where thick wall steel pressure vessels are not readily available. Thus there is T-CAES system configuration that uses concrete that it readily available. There are commercial pipe companies that have successfully transferred 500-psig water over long distances using reinforced concrete that contains not only the usual reinforcement bar network but also use a thin metal liner. The key to their commercial success has been the special end configuration of each pipe that permits the end to end attachment of separately manufactured lengths of pipes. This special end coupling is required for the tens of miles of pipe above ground exposed to heat and cold and to hills and valleys. This special end coupling is not required for reinforced concrete pipes 200 feet in length exposed to nearly the same temperature all the time and with no changes in elevation.

Another reinforced concrete pipe company mixes in short lengths of high strength fiber in the concrete to enhance concrete's notorious poor tensile strength.

The T-CAES system would then need to operate at a lower pressure vessel pressure, say, 600 psig. The turboexpander/generator set would operate with a one-stage turboexpander at 100 psig pressure input.

In order for the system to operate with a reinforced concrete thick wall pressure vessel there is now necessary to arrange for heat transfer to the expanding air that is dropping in temperature as the pressure vessel progressively discharges its air to assure near constant temperature delivery of the 100 psig compressed air to the turboexpander input port.

The compressed air discharged from the pressure vessel is piped onto the barge deck, pipe to the mass control valve on the barge deck, enters a set of four parallel pipes that are underwater alongside the 200 feet long barge, heated by the surrounding water alongside the barge and then fed to the turboexpander input port. A 400 feet required pipe length would require that the pipe be fed back and forth below the barge.

FIG. 13 shows that at the beginning of the discharge when the air from the pressure vessel is still above 30° F., only a short length of the set of pipes perform the warming. But as the air from the pressure vessel gets colder and colder, more and more of the total available pipe length is used to assure the required heat exchange.

The cold pressurized air from the pressure vessel starts flowing through a pipe at an initial air temperature and the air is then heated by the water surrounding the pipe. The pipe is maintained at the same temperature by the ambient water surrounding its outside surface. The minimum pipe length (L) required to assure that the heat transfer to the air given by: $\dot{Q} = \dot{M} \cdot C_p \cdot (T_{final} - T_{initial})$ The heat transfer from the pipe to the air in the pipe is also given by: $\dot{Q} = h \cdot \pi \cdot D \cdot L \cdot (T_{water} - T_{LMTD\ air})$ These two equations, the boundary temperatures at the inlet of the pipe and outlet of the pipe, and at the outside of the pipe in the water as well as the Logarithmic Mean Temperature Difference (LMTD) for the heat exchanger configuration permit the determination of the pipe length. However, the heat transfer coefficient "h" is required.

The value of "h" is determined from the air flow requirement from the turboexpander, pipe diameter and air properties as follows:
a. Reynolds Number:
  i. $\rho$ is density of the flowing fluid.
  ii. $\mu$ is viscosity of the flowing fluid.
  iii. L is a characteristic length of the problem. For pipe flow L=D, where D is the pipe diameter.
  iv. U is a characteristic axial velocity $$Re==\rho UD/\rho$$

Prandtl Number: Cp is the constant-pressure specific heat of the flowing fluid. k is the conductivity of the flowing fluid. Pr=Cp $\mu$/k Nusselt Number: h is the heat transfer coefficient. Nu=hL/k.

Correlation for Turbulent Flow (Dittus-Boelter):
a. h=k/D*0.023*Re$^{0.8}$Pr$^n$
b. n=0.33 heating
c. n=−0.40 cooling
d. 0.65≤Pr≤160

The air pressure in the pipe and the permissible pressure drop determine the permitted pipe length. The pressure drop formula is given by: $\Delta P=f*L/D*(0.5\ \rho U^2)$, where f is the friction factor ~0.02 for many commercial.

The pipe length calculations are slightly conservative in that the heat transfer coefficient, h=50 BTU/(Hr SqFt F) at −50° F. is used rather than the enhanced h=53 BTU/(Hr SqFt F) at +60° F. for the 5,000 kWe turboexpander input; that the heat transfer coefficient, h=13.9 BTU/(Hr SqFt F) at −50° F. is used rather than the enhanced h=14.6 BTU/(Hr SqFt F) at +60° F. for the 1,000 kWe turboexpander input.

The reinforced concrete material pressure vessel is not a complete thermal insulator. The internal thin wall metal steel liner and network of metal reinforcement bars provide heat transfer. The direct contact of the concrete outer surface with the water also assures some heat exchange to the expanding air.

The pressure vessel made of reinforced concrete also results in a net buoyancy force to assist the barge floatation.

Specific Example of T-CAES System and FPP System Integration

The steps required to size the integrated CAES and FPP system are:
a. Define the electric power requirement of the Genset (say, 11,350 kWe)
b. Define the electrical power requirement (say, 2,000 kWe)
c. Define the number of hours of the electrical power discharge (say, 8 hours)
d. Calculate the pressure vessel volume required
e. Define the length of the pressure vessel or length of barge (say, 200 feet lengths)
f. Define the inside diameter of the pressure vessel (pipe) (say, 4 feet)
g. Calculate the outside diameter of the pressure vessel
h. Define the space between horizontal pressure vessels (say, 0.5 feet)
i. Define the space between vertical pressure vessels (say, 0 feet)
j. Define the width of the array of pressurized pipes or width of barge (110 feet)
k. Calculate the layers of pipes below the barge deck
l. Calculate the weight of the pressurized pipes
m. Calculate the buoyancy force
n. Calculate the educator inflow air mass
o. Calculate the size of the compressor Genset Power and Airflow Intake: Caterpillar Company, Solar Turbines, MARS 100 Genset, 11,350 kWe, 73,727 SCFM intake air Turboexpander Power: 2,000 kW, 2,681 HP, 11.9 SCFM/HP (15% thermodynamic efficiency), 31,903 SCFM required.

Turboexpander Power Discharge Time: 8 hours, 480 minutes, 15,313,673 SCF required.

Calculate the required Pressure Volume: 4 ft diameter, 18,000 feet length cylinder, 226,195 CU FT water volume, 18,728,826 SCF at 1,214.67 psia (start of operation), 3,309,967 SCF at 214.67 psia (end of operation), 15,418,860 SCF available air volume to drive turboexpander Define the length of each Pipe Cylinder based on Barge Length: 200 feet lengths or 62 meters length, 90 cylinders required for 18,000 total pipe length.

Calculate the wall thickness required of the Pipe Cylinder: 40,000 psi stainless steel 316 tensile yield strength, 1,200 psig internal pressure, 48 inches internal diameter, 0.72 inches wall thickness required for safety factor=1.0, 1.44 inches wall thickness required for safety factor=2.0

The pressure vessel will be under water and there will be no nearby personnel so that a safety factor=2.0 is recommended.

Calculate the outside diameter required of the Pipe Cylinder: 50.88 inches outside diameter, 4.24 feet outside diameter, 0.5 ft spacing between cylinders.

Calculate the number of cylinders in a layer: 23 cylinders per layer, 109 feet width (or 33.2 meters wide).

Calculate the number of layers: 90 cylinders required for 18,000 total pipe length, 23 cylinders per layer, 4 layers.

Calculate the weight of the cylinders (excluding the weight of end domes and manifold): 495 pounds per cubic feet of steel, 48 inches internal diameter, 1.44 inches wall thickness, 18,000 feet total pipe length, 14,098,261 pounds of all pipes, 7,049 tons as downward weight force when not underwater.

Calculate the buoyancy force: 64 pounds per cubic feet of salt water displaced, 50.88 inches outside diameter, 18,000 feet total pipe length, 8,133 tons of upward buoyancy force.

Calculate the educator inflow rate of ambient air using Genset air intake requirement: 11,350 kWe Genset, 91.8 pounds of air intake per second, 0.075 pounds/cu ft at STP, 73,440 SCFM, 100 deg F. input air temperature, −22 deg F. output air temperature, 39,028 SCFM ambient air, −170 deg F. input turboexpander exhaust air, −22 deg F. output air temperature, 31,903 SCFM turboexpander air, 70,931 SCFM total air flow from eductor to Genset (almost matched to 73,440, repeat calculation until matched.

Calculate the compressor size: 2,750 kW, 3,686 HIP, 2.2 SCFM-IHP, 8,110 SCFM required.

| Air Pressure (psia) | Thermodynamic Efficiency (%) | Thermodynamic Efficiency (SCF/HP) |
|---|---|---|
| 205 | 75 | 3.75 |
| 394 | 75 | 3.0 |
| 726 | 70 | 2.50 |
| 1,253 | 63 | 2.14 |

Use 2.2 SCFM/HP in this calculation to assure a conservative selection for the air compressor. This value is conservative because the operational cycle consists of compressing the pressure vessel from 214.67 psia to 1,214.67 psia in each cycle.

16 hours
960 minutes
7,785,523 SCF required
4 feet inside diameter
9,100 feet length cylinder
114,354 CU FT water volume
9,468,462 SCF at 1,214.67 psia
1,673,372 SCF at 214.67 psia
7,795,090 SCF available (matched)

The above set of calculations can be used for sizing other combinations of compressor, pressure vessels, turboexpander/generator set, educator and turbocompressor driven Genset.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. An offshore compressed air energy storage system comprising:
   a. a barge, the barge having
      i. a deck surface,
      ii. one or more pressure vessels attached to the bottom of the deck surface, the one or more pressure vessels providing floatation for the barge, the pressure vessels being in fluid communication with one another via a manifold;
   b. a power source;
   c. at least one air compressor provided on the deck surface of the barge, the power source being configured to power the at least one air compressor, the at least one air compressor is configured to pressurize the one or more pressure vessels; and
   d. a compander provided on the deck surface of the barge, the compander having,
      i. at least one turboexpander having an input, an output, and a shaft,
      ii. at least one heat exchanger, and
      iii. at least one turbocompressor,
   wherein the compander exhausts superchilled air;
   e. a mass air control valve configured to control compressed air flow from the manifold of the one or more pressure vessels to the turboexpander; and
   f. a generator provided on the deck surface of the barge, wherein the generator is in communication with the shaft of the turboexpander, and wherein the shaft of the turboexpander is configured to drive the generator.

2. The system of claim 1, wherein the power source is provided on the deck surface of the barge.

3. The system of claim 2, wherein the power source is one or more wind turbines.

4. The system of claim 2, wherein the power source is one or more photovoltaic cells.

5. The system of claim 2, wherein the system is transportable.

6. The system of claim 1, wherein the power source is geothermal energy source.

7. The system of claim 1, wherein the power source is a utility electric power grid.

8. The system of claim 1, further comprising:
   a. a desalination facility comprising:
      i. a desalination chamber;
      ii. a salt water sprayer;
      iii. a hopper; and
      iv. a centrifuge in communication with the desalination chamber and the hopper,
   wherein the superchilled air exhausted by the compander freezes sprayed water within the desalination chamber, wherein the frozen water is collected in the hopper, and wherein the desalination facility is provided on the deck surface of the barge.

9. The system of claim 8, wherein the power source is provided on the deck surface of the barge.

10. The system of claim 9, wherein the power source is one or more wind turbines.

11. The system of claim 9, wherein the power source is one or more photovoltaic cells.

12. The system of claim 9, wherein the system is transportable.

13. The system of claim 8, wherein the power source is geothermal energy source.

14. The system of claim 8, wherein the power source is a utility electric power grid.

* * * * *